United States Patent
Soenen et al.

(10) Patent No.: US 8,598,854 B2
(45) Date of Patent: Dec. 3, 2013

(54) LDO REGULATORS FOR INTEGRATED APPLICATIONS

(75) Inventors: Eric Soenen, Austin, TX (US); Alan Roth, Austin, TX (US); Justin Shi, Austin, TX (US); Ying-Chih Hsu, Hsinchu (TW); Guang-Cheng Wang, Zhubei (TW); Wen-Shen Chou, Taipei (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 264 days.

(21) Appl. No.: 12/857,092

(22) Filed: Aug. 16, 2010

(65) Prior Publication Data

US 2011/0089916 A1 Apr. 21, 2011

Related U.S. Application Data

(60) Provisional application No. 61/253,287, filed on Oct. 20, 2009.

(51) Int. Cl.
*G05F 1/613* (2006.01)
*H02M 3/18* (2006.01)

(52) U.S. Cl.
USPC .............................. 323/274; 323/269; 363/59

(58) Field of Classification Search
USPC .............. 323/265, 269, 273, 274; 363/59, 60; 327/108, 536, 537
See application file for complete search history.

(56) References Cited

U.S. PATENT DOCUMENTS

| | | | |
|---|---|---|---|
| 5,426,334 A | 6/1995 | Skovmand | |
| 5,440,258 A | 8/1995 | Galbi et al. | |
| 7,119,590 B1 * | 10/2006 | Song | 327/156 |
| 7,319,314 B1 | 1/2008 | Maheshwari et al. | |
| 7,348,829 B2 * | 3/2008 | Choy et al. | 327/536 |
| 7,576,594 B2 * | 8/2009 | Shozo | 327/538 |
| 7,821,328 B2 * | 10/2010 | Hoque et al. | 327/536 |
| 8,026,702 B2 * | 9/2011 | Tanzawa | 323/267 |
| 8,054,054 B2 * | 11/2011 | Lee | 323/271 |
| 8,080,984 B1 * | 12/2011 | Geynet | 323/280 |
| 2007/0183174 A1 | 8/2007 | Lee | |

FOREIGN PATENT DOCUMENTS

| | | |
|---|---|---|
| CN | 101505141 | 8/2009 |
| CN | 101859159 | 10/2010 |
| EP | 1303039 | 4/2003 |
| JP | 2008003727 | 1/2008 |
| TW | 200601674 | 1/2006 |
| TW | 200836463 | 9/2008 |

OTHER PUBLICATIONS

"5V-to-3.3V Supply Voltage Regulator", Research Disclosure database No. 395023, published in the Mar. 1997 paper journal, pp. 7-11.

(Continued)

*Primary Examiner* — Gary L Laxton
(74) *Attorney, Agent, or Firm* — Lowe Hauptman & Ham, LLP

(57) ABSTRACT

An amplifier drives the gate of a master source follower and of at least one slave source follower to form a low-dropout (LDO) regulator. Alternatively, a charge pump drives the master source follower to form the regulator. Additional slave source followers may be used in conjunction with the charge pump and the master source follower to improve the regulator performance.

21 Claims, 9 Drawing Sheets

(56) References Cited

OTHER PUBLICATIONS

OA dated Feb. 29, 2012 from corresponding application No. CN 201010518056.8.
Notice of Reasons for Refusal with English Translation dated Oct. 16, 2012 from corresponding application No. JP2010-0235535.
Office Action dated Dec. 28, 2012 from corresponding application No. CN 201010518056.8.
Hazucha, Peter, et al, "Are-Efficient Linear Regulator with Ultra-Fast Load Regulation", IEEE Journal of Solid-State Circuits, vol. 40, No. 4, Apr. 2005, pp. 933-940.
Office Action dated Jul. 9, 2013 from corresponding application No. CN 201010518056.8.
Office Action dated Jul. 29, 2013 from corresponding application No. TW 099135704.

* cited by examiner

US 8,598,854 B2

LDO REGULATORS FOR INTEGRATED APPLICATIONS

CROSS-REFERENCE TO RELATED APPLICATIONS

The present application claims priority of U.S. Provisional Patent Application Ser. No. 61/253,287 filed on Oct. 20, 2009 which is incorporated herein by reference in its entirety.

FIELD

The present disclosure is generally related to LDO (low-dropout) regulators. Various embodiments use a charge pump in conjunction with a source follower to form a regulator.

BACKGROUND

Traditionally, LDO regulators include an amplifier and a closed-loop feedback to provide appropriate output levels. The limited frequency response, however, implies the inefficiency of high-speed applications, and, the closed loop may induce instability when the output is connected to large-capacitance or low-current loadings. Further, in the advance process node (e.g., 0.13 µm or below), the specified voltage levels are needed to enlarge the supply voltage or to clamp the voltage range for certain purposes.

BRIEF DESCRIPTION OF THE DRAWINGS

The details of one or more embodiments of the disclosure are set forth in the accompanying drawings and the description below. Other features and advantages of the disclosure will be apparent from the description, drawings, and claims.

Like reference symbols in the various drawings indicate like elements.

DETAILED DESCRIPTION

Figure 1:
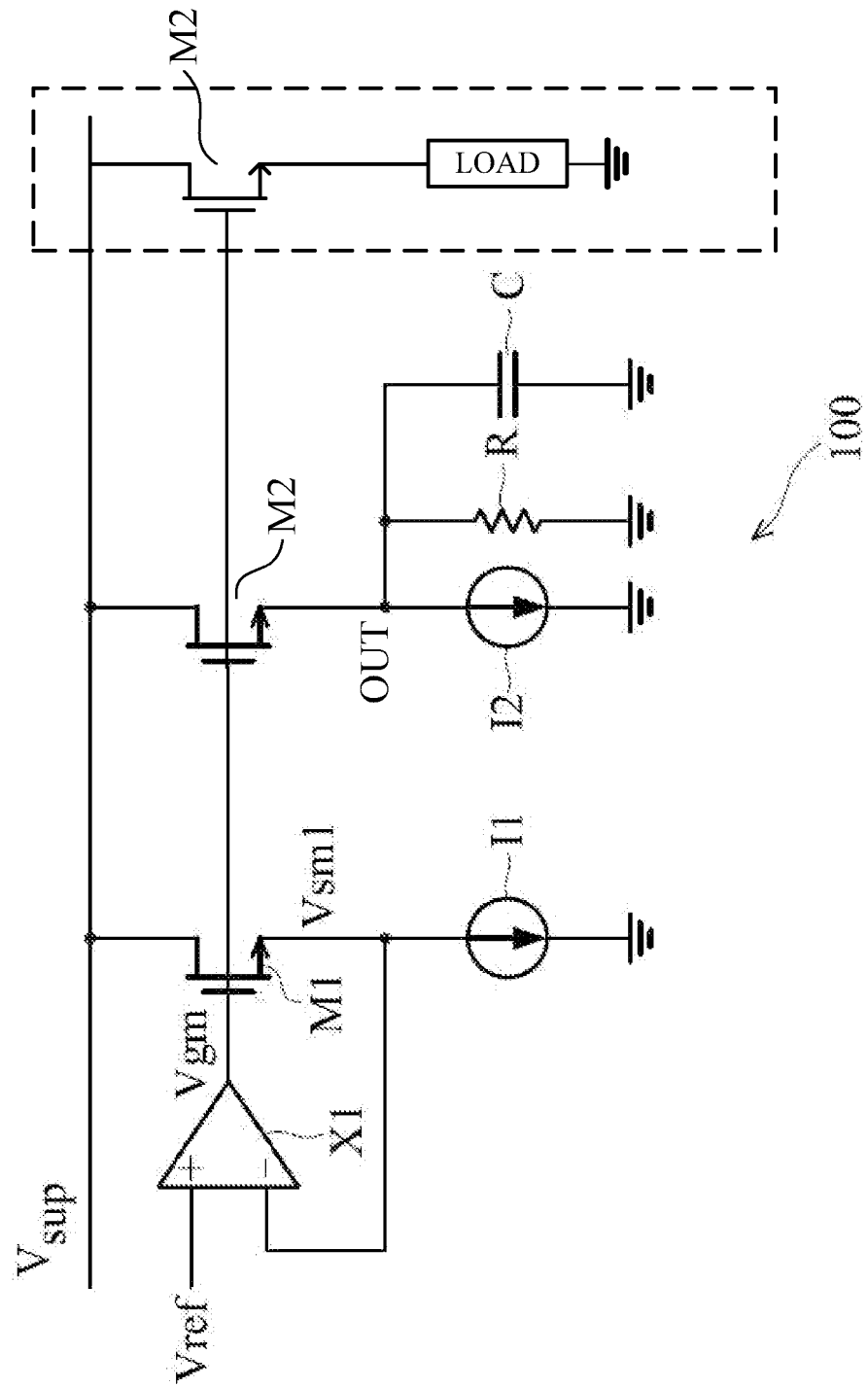
FIG. 1 shows an LDO in accordance with a first embodiment of the disclosure.

Embodiments, or examples, of the disclosure illustrated in the drawings are now described using specific language. It will nevertheless be understood that no limitation of the scope of the invention is thereby intended. Any alterations and modifications in the described embodiments, and any further applications of principles of the disclosure described in this document are contemplated as would normally occur to one skilled in the art to which the disclosure relates. Reference numbers may be repeated throughout the embodiments, but this does not necessarily require that feature(s) of one embodiment apply to another embodiment, even if they share the same reference number.

LDO Regulator

Embodiment Using an Amplifier and Source Followers

FIG. 1 shows an exemplary LDO regulator 100 in accordance with an embodiment using an amplifier and source followers. Supply voltage Vsup provides voltage supply to regulator 100, and in many applications includes voltage of a battery (e.g., Vbat). Resistor R and capacitor C serve as a load for regulator 100, which could be, for example, a processor. Current sources I1 and I2 serve to provide current paths to regulator 100.

Amplifier X1 is non-inverting, i.e., receiving reference voltage Vref at the positive terminal instead of the negative terminal like many other approaches. Amplifier X1 uses the feedback loop from the source of master source follower M1 to the inverting (e.g., negative) terminal to stabilize circuit 100, i.e., ensure the frequency response of amplifier X1 is appropriate. Amplifier X1 compares reference voltage Vref to voltage Vsm1 (e.g., the voltage at the source of master source follower M1), and amplifies the difference between these two voltages. Amplifier X1 forces voltage Vsm1 in the direction to be equal to voltage Vref. For example, if voltage Vsm1 is too low amplifier X1 forces voltage Vgm1 and thus voltage Vsm1 to be higher, and if voltage Vsm1 is too high, amplifier X1 forces voltage Vgm1 to be lower.

Master source follower M1 is an NMOS transistor that pre-regulates the voltage output by slave source follower M2, which is also an NMOS transistor. The voltage drop across slave source follower M2 is substantially the same as the voltage drop across master source follower M1, and the output of slave source follower M2 substantially follows the output of master source follower M1. Depending on technologies, the output of master source follower M1 and slave source follower M2 differs about 100 mV.

FIG. 1 shows one slave source follower M2 for illustration, but additional source followers comparable to source follower M2 with corresponding loading (e.g., capacitor, resistor, voltage Vout) connected in parallel (e.g., each of the drains and the gates are connected together) may be used. Additionally or alternatively, a slave source follower M2 may be larger than the master source follower M1. Depending on applications and the number of slave source followers M2 being used, a slave source follower M2 may be in the order of ten or hundred times larger than master source follower M1. The gate of the source followers M1 and M2 are shared and do not change much even if a lot of fast switching may be occurring at node output Vout. This is because the large slave source follower M2 can provide a large current in response to the switching. As a result, NMOS source followers M1 and M2, from a dynamic point of view, can resist glitches at output Vout without using much current. Alternatively expressing, NMOS source followers M1 and M2 provide better dynamic response and energy efficiency.

Various embodiments of the disclosure are advantageous over other approaches because a very small amplifier X1 that uses little or insignificant current (e.g., 1 uA) together with a large slave source follower M2 can regulate a large current at the load comprising resistor R and capacitor C. In effect, the current supplied to the load is from supply voltage Vsup, but there is little or no current going through the gate of source followers M1 and M2. Source followers M1 and M2 provide current to the load and do not require a fast amplifier X1 that requires large power. Further, because slave source follower M2 is not part of the feedback loop of amplifier X1, output node Vout of slave source follower M2 is unconditionally stable regardless of the size of capacitor C.

Various embodiments of the disclosure use NMOS source followers, e.g., transistors, M1 and M2, instead of a common source PMOS transistor like in other approaches because PMOS transistors generally do not have good driving capabilities. When a PMOS transistor is used in other approaches, amplifier X1 driving the PMOS transistor should be fast and thus consume much power.

LDO Regulator

Embodiments Using a Charge Pump

Figure 2:
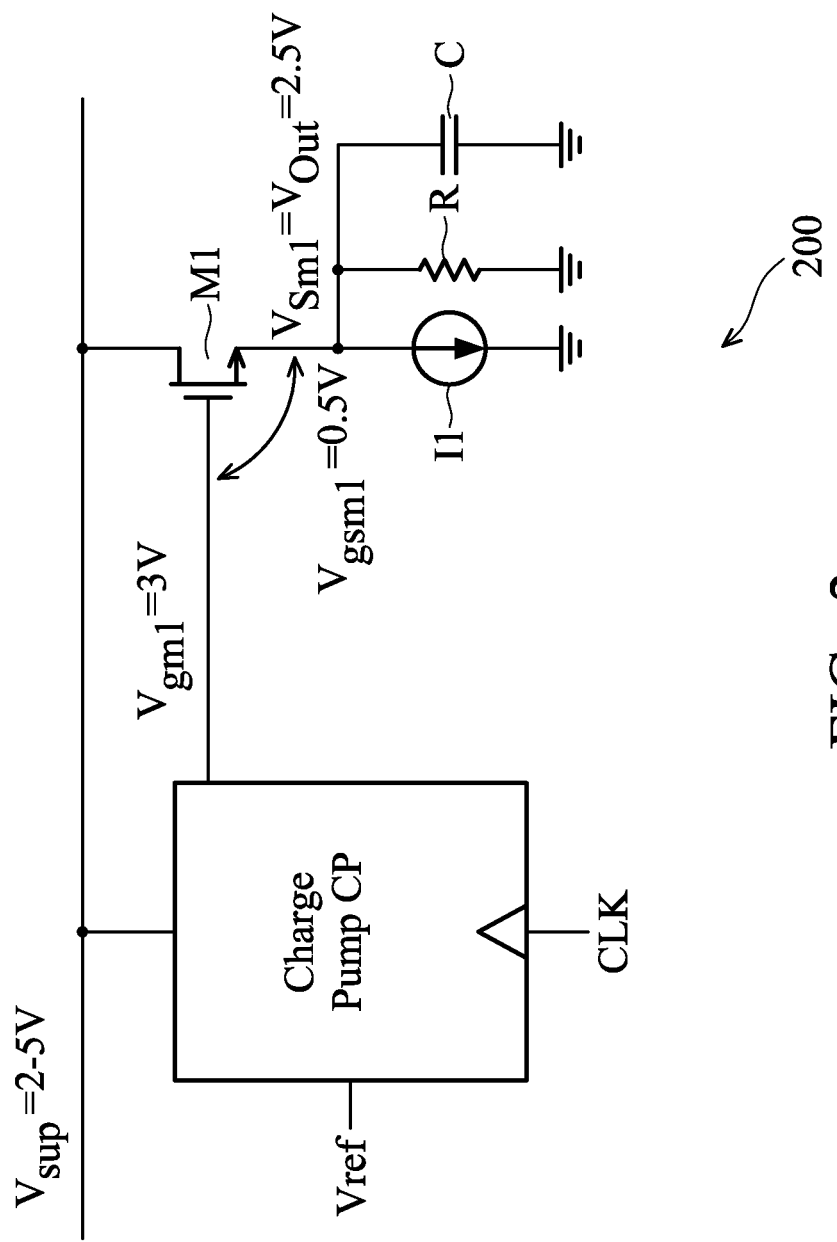
FIG. 2 shows an LDO in accordance with a second embodiment of the disclosure.

FIG. 2 shows a circuit 200 illustrating an LDO regulator in accordance with an embodiment using a charge pump in conjunction with an NMOS source follower. As compared to regulator 100, regulator 200 includes a charge pump CP being used in place of amplifier X1. For simplicity, FIG. 2 does not show a slave source follower M2 as in FIG. 100, but providing one or a plurality of slave source followers M2 to work in conjunction with charge pump CP is within the scope of embodiments of the disclosure. Applications of slave source followers M2 for regulator 100 are applicable for regulator 200.

Charge pump CP uses voltage Vref to provide the appropriate voltage Vgm1, i.e., the voltage at the gate of master source follower M1. Those skilled in the art will recognize that a charge pump (e.g., charge pump CP) is a kind of DC-DC converter that can double, triple, halve, scale, etc., reference voltages (e.g., Vref) or generate arbitrary voltages, depending on a controller and circuit topology, etc. Clock CLK provides the clock source for charge pump CP. Voltage Vout is in fact voltage Vsm1, the voltage at the source of source follower M1. Depending on applications voltage Vgm1 can be higher than voltage Vsup, which allows regulator 200 to operate as a true LDO regulator. Even if supply voltage Vsup falls to a very low value, regulator 200 continues to function because charge pump CP can still generate a voltage Vgm1 that is higher than supply voltage Vsup. For illustration, Vsup ranges from 2-5V. Further, if voltage Vout is desired to be at 2.5V, voltage Vgsm1 is 0.5V, then voltage Vgm1 is 3V (e.g., Vsm1 or Vout (2.5V)+Vgsm1 (0.5V)). In an embodiment, charge pump CP doubles voltage Vref at 1.5V to provide 3V to voltage Vgm1. For further example, voltage Vsup is 4.0V, and, because voltage Vsup is higher than voltage Vgm1, regulator 200 functions normally. But if, for another example, voltage Vsup drops down to about 3.0V or 2.7V, regulator 200 continues to function unlike other approaches using an op-amp that would hardly work at 3.0V (e.g., about the same level as voltage Vgm1) and would not work at 2.7V (e.g., below voltage Vgm1).

Figure 3:
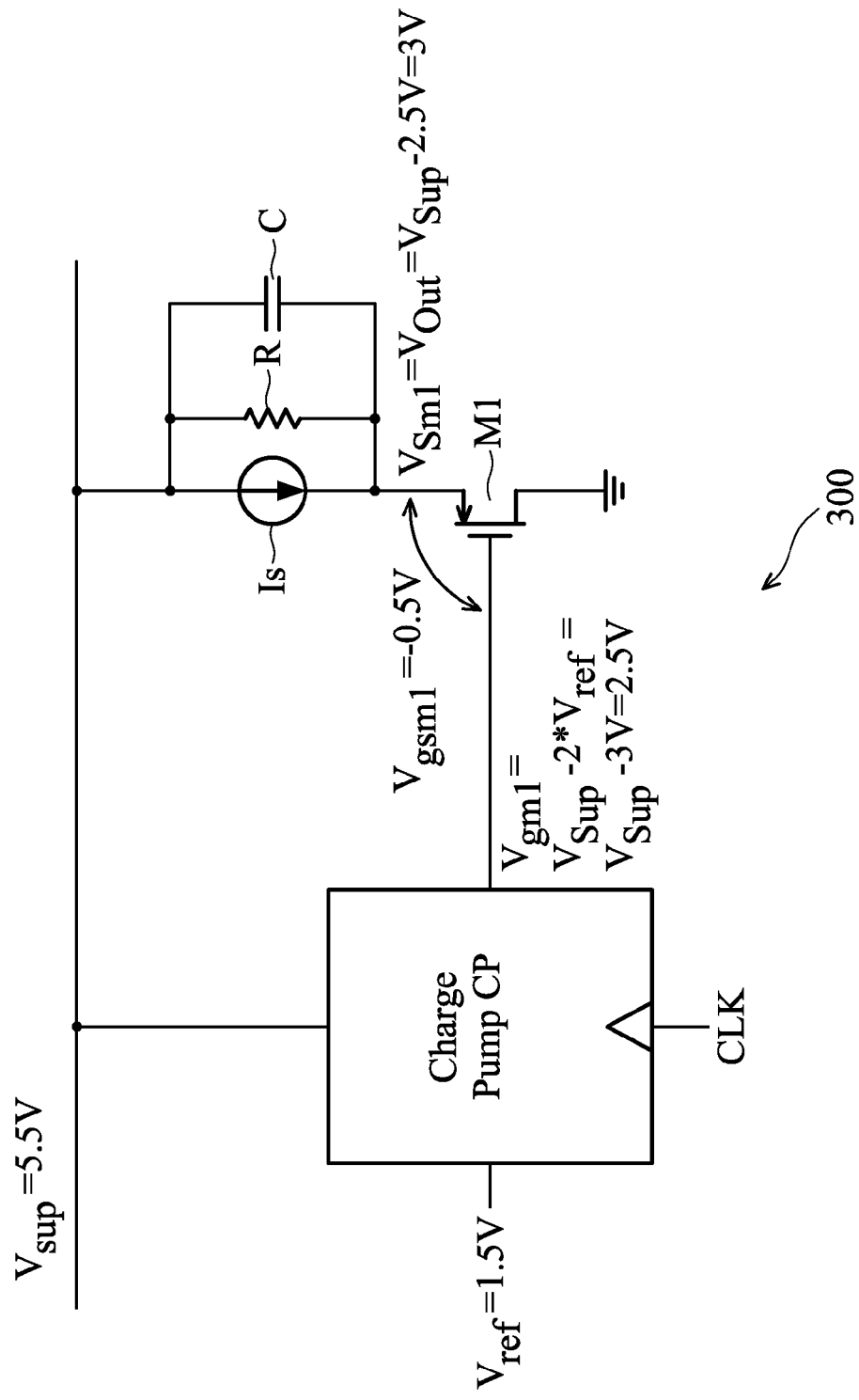
FIG. 3 shows an LDO in accordance with a third embodiment of the disclosure.

FIG. 3 shows a circuit 300 illustrating an LDO in accordance with an embodiment using a charge pump in conjunction with a PMOS source follower. As compared to circuit 200, circuit 300 uses a PMOS, instead of an NMOS, source follower. As a result, voltage levels and various components (e.g., the load, the current source Is, etc.) are re-configured to work with this PMOS source follower and should be recognizable by a person skilled in the art after reviewing this document. Various embodiments of the disclosure can provide the LDO output level without the limitation of the supply range. For example, Vgsm1 of PMOS source follower is −0.5V; charge pump CP generates and provides voltage Vgm1 to be Vsup−2*Vref or Vsup−3V or 2.5V. Further, voltage Vsup is at 5.5 V, and voltage Vout is Vsup−2.5V or 3V, etc.

Charge Pump

Modes of Operation

Charge pump CP in various embodiments of the disclosure can be used in an open loop or closed loop mode. In an open loop embodiment, clock CLK keeps running and charge pump CP operates normally. Voltage Vout and voltage Vgm1 is not monitored, but voltage Vgm1 is generated and kept as a constant based on estimation because it remains constant regardless of voltage Vsup. In the above example related to LDO 200 where voltage Vout is desired to be at 2.5V, voltage Vgsm1 is about 0.5V, voltage Vgm1 is estimated and kept constant to be about 3.0V. In an embodiment, voltage Vref is doubled to provide the estimated 3V for voltage Vgm1.

Figure 4:
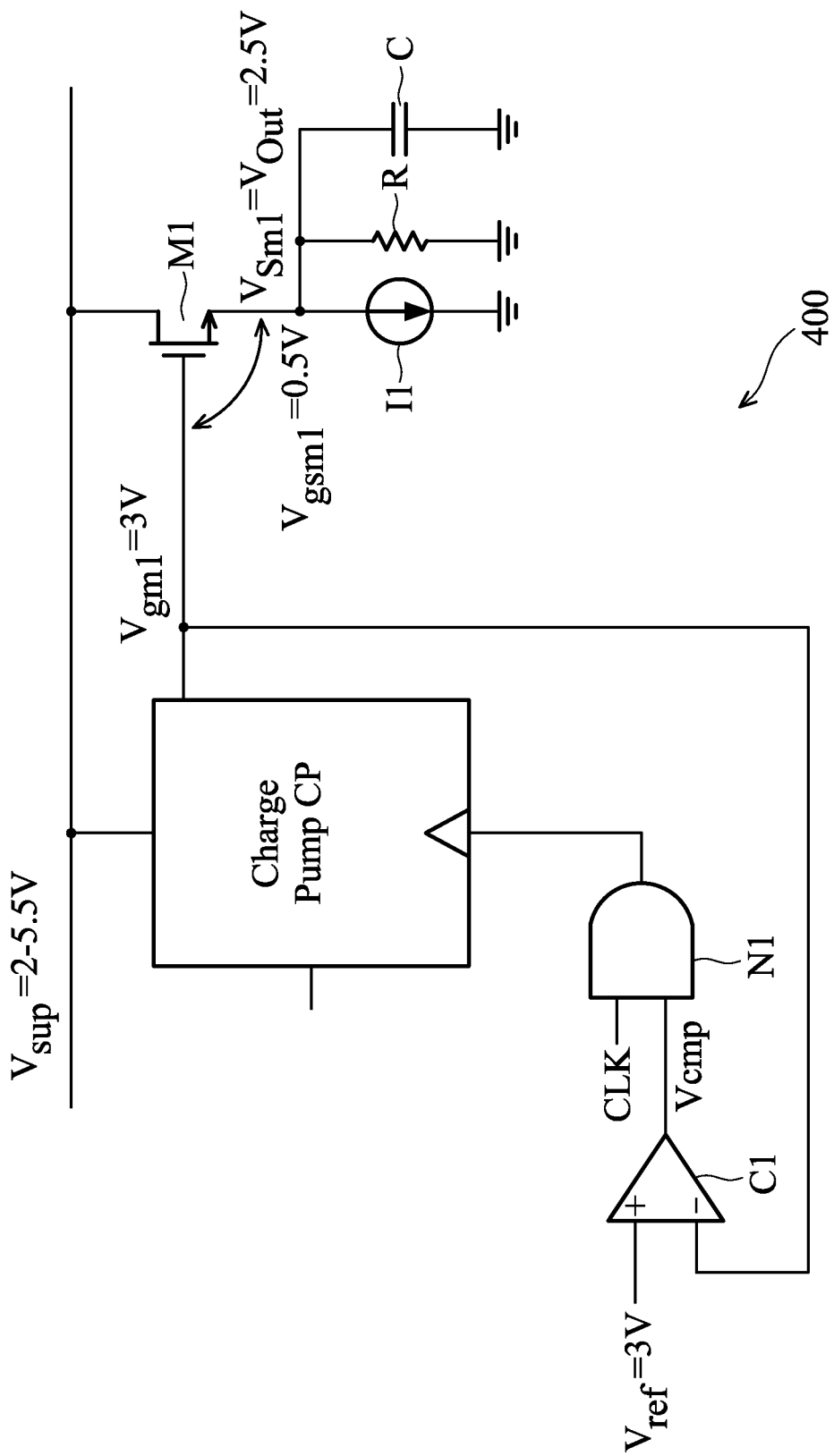
FIG. 4 shows the LDO in FIG. 2 using a closed-loop for the charge pump, in accordance with an embodiment of the disclosure.

When using feedback for charge pump CP in the closed loop mode, the feedback can monitor either the source (e.g., node at Vout) or the gate (e.g., node at Vgm1) of source follower M1 to turn on/off charge pump CP as appropriate. FIG. 4 shows a circuit 400 illustrating the LDO 200 being used in a closed loop mode wherein voltage Vgm1 is monitored, and if voltage Vgm1 reaches a certain voltage (e.g., 3V), charge pump CP is turned off. In this FIG. 4 embodiment, voltage Vgm1 is fed back to the inverting terminal of comparator C1 through the feedback resistor R1, which is selected so that voltage Vgmf (e.g., the feedback voltage) is comparable to voltage Vref. In FIG. 4, two resistors R1 are selected and configured as a voltage divider so that voltage Vgmf is at half of voltage Vgm1 or 1.5V. Further, voltage Vref is connected to the non-inverting input of comparator C1 and the charge pump CP. Comparator C1 compares voltage Vgmf to voltage Vref and provides voltage Vcmp as appropriate. If voltage Vgmf is lower than voltage Vref, comparator C1 provides a high for voltage Vcmp, and when voltage Vgmf reaches voltage Vref or higher comparator C1 provides a low for voltage Vcmp. AND gate N1 controls clock CLK, e.g., allowing it to pass through when voltage Vcmp is high, and disables it when voltage Vcmp is low. In effect, clock CLK is running and activating charge pump CP when voltage Vgmf is lower than voltage Vref (e.g., voltage Vgm1 is lower than 3V), and is de-activated (e.g., stops running) when voltage Vgmf reaches voltage Vref or higher.

In an alternative embodiment, the feedback loop starts at the source, e.g., node at voltage Vsm1, instead of the gate, e.g., node at voltage Vgm1, of source follower M1. In this situation, voltage Vref is adjusted to take account of voltage Vgsm1 as voltage Vsm1 equals to Vgm1−Vgsm1. In an embodiment, the feedback ratio is adjusted to Vref/Vout, where Vout is the predetermined value such as 2.5V. As a result charge pump CP operates normally when voltage Vout is lower than 2.5 V, but when voltage Vout reaches the desired level of 2.5V charge pump CP is disable.

Charge Pump

First Embodiment

Figure 5:
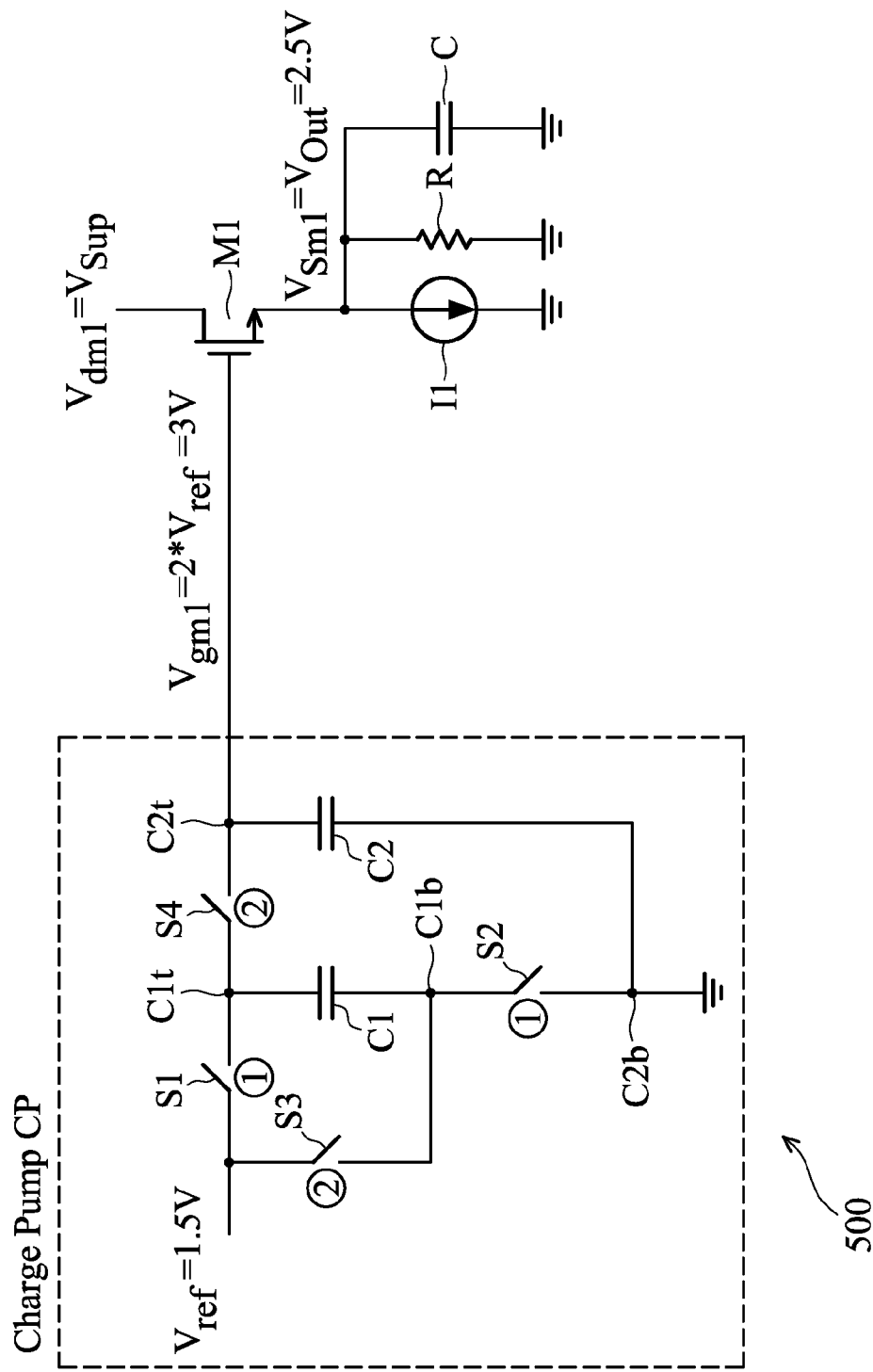
FIG. 5 shows a first embodiment of the charge pump in the LDO of FIG. 2.

FIG. 5 shows a charge pump 500 illustrating a first embodiment of a charge pump CP in FIG. 2 being used in conjunction with an NMOS source follower M1. Output voltage of charge pump 500 is in fact voltage Vsm1, which depends on voltage Vref that, for illustration purposes, is at 1.5V. Reference circles (1) and (2) indicate whether a switch is closed or open at a particular time phase P1 or P2. For illustration shown in FIG. 5, switches S1 and S2 are closed in phase P1 and open in phase P2 while switches S3 and S4 are closed in phase P2 and open in phase P1.

In phase P1 where switches S1 and S2 are closed (and switches S3 and S4 are open), capacitor C1 is connected to voltage Vref via node C1t and ground via node C1b, and therefore is charged to voltage Vref. In phase P2 node C1b is connected to voltage Vref and node C1t is connected to node C2t. In effect, capacitor C1 experiences voltage Vref on both of its ends, and node C1t therefore experiences two times voltage Vref. Further, because node C1t is coupled to node C2t, the two times voltage Vref of node Ct1 is transferred to capacitor C2 or the gate of source follower M1, resulting in voltage Vgm1 being two times voltage Vref or 3V. In an embodiment clock CLK shown in FIG. 2 is configured to control switches S (e.g., switches 51, S2, S3, S4, etc.). For example, clock CLK's first logic state (e.g., low) opens the first set of switches (e.g., phase P1 switches S1 and S2) and closes the second set of switches (e.g., phase P2 switches S3 and S4). Similarly, clock CLK's second logic state (e.g., high) closes the phase P1 switches S1 and S2 and opens the phase P2 switches S3 and S4.

Charge Pump

Second Embodiment

Figure 6:
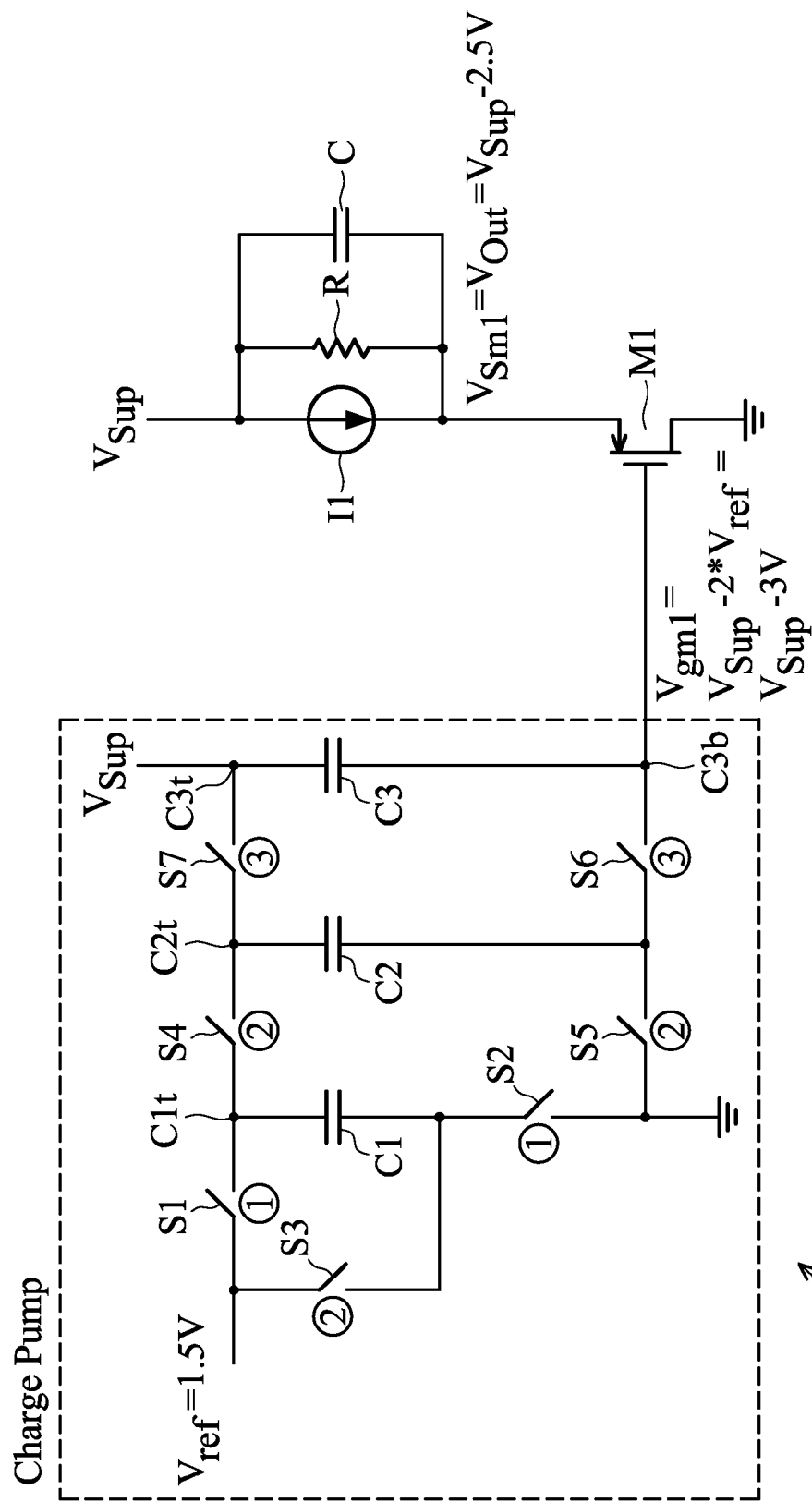
FIG. 6 shows a second embodiment of the charge pump in FIG. 3.

FIG. 6 shows a charge pump 600 illustrating a second embodiment of charge pump CP that works in conjunction with a PMOS source follower M1. Charge pump 600 creates voltage Vgm1 being equal to Vsup−2*Vref or Vsup−3V and used in circuit 300. As compared to charge pump 500, charge pump 600 further includes capacitor C3 and switches S5, S6 and S7.

In phase P1 switches S1 and S2 are closed. In phase P2 switches S3, S4, and S5 are closed, and in phase P3 switches S6 and S7 are closed. Similar to charge pump 500, node C2t of capacitor C2 in phase P2 experiences 2*Vref. Additionally, in phase P3, voltage 2*Vref is transferred to node C3t which has been connected to voltage Vsup, node C3b thus experiences Vsup−2*Vref or Vsup−3V, resulting in Vgm1 being Vsup−3V. Similar to the embodiment of FIG. 5, the first logic state (e.g., low) of clock CLK opens the first set (e.g., S1 and S2) and closes the second set (e.g., S3, S4, and S5) of switches. The second logic state (e.g., high) of clock CLK closes the first set (e.g., S1 and S2) and opens the second set (e.g., S3, S4, and S5) of switches. Depending on applications, phase P3 could be in phase with phase P1 to reduce the complexity of the circuit.

Various embodiments of the disclosure are advantageous because there is not complex analog circuitry to generate voltage Vgm1 unlike other approaches. Various embodiments use simple switches with capacitors. As a result, various embodiments of the disclosure can provide a full voltage Vsup to the gate of the source follower M1.

Illustrative Waveforms

Figure 7:
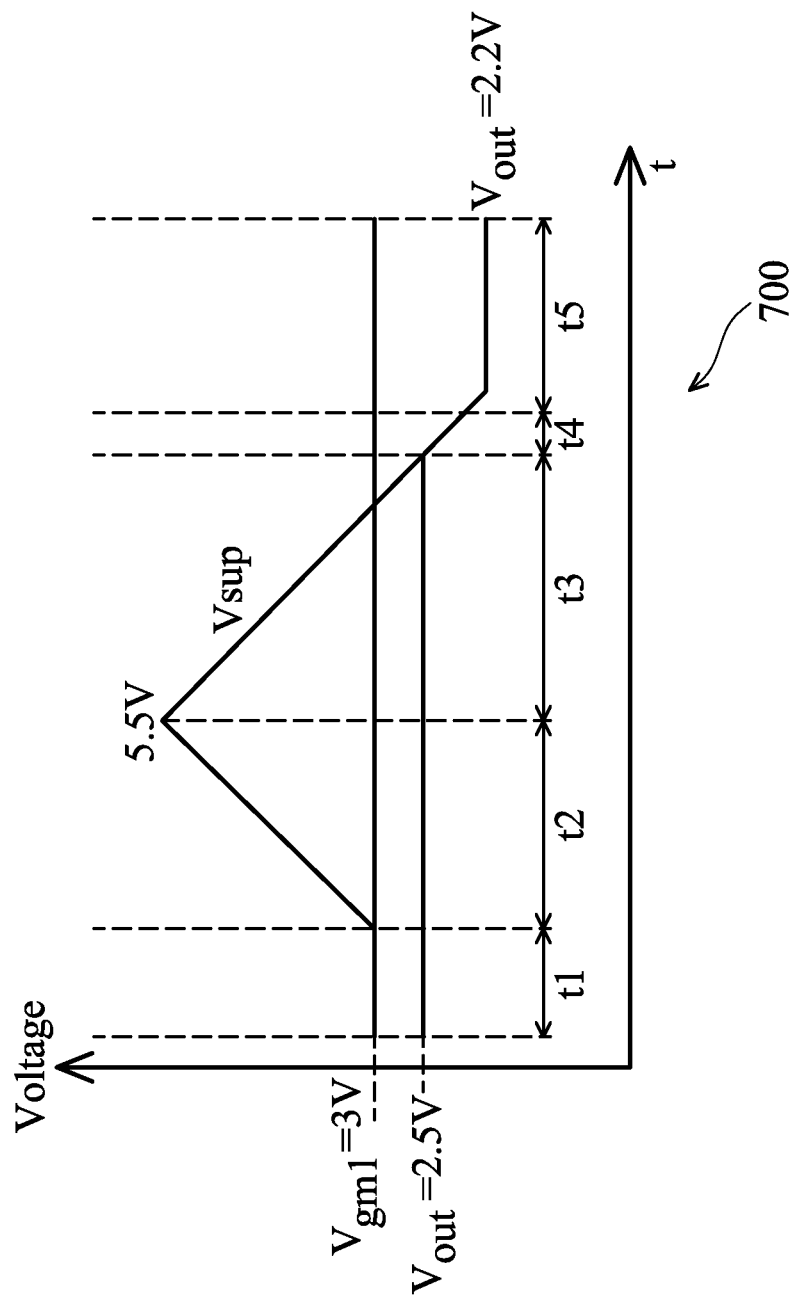
FIG. 7 shows waveforms illustrating relationship between a supply voltage and an output voltage of the LDO in FIG. 2.

FIG. 7 shows a diagram 700 illustrating a waveform relationship between supply voltage Vsup, gate voltage Vgm1, and output voltage Vout of the LDO 200 in FIG. 2.

In this diagram 700, voltage Vsup is shown as starting and remaining at 3V for time t1, rising from 3V to 5.5V during time t2, decreasing from 5.5V to 2.2V during time t3 and t4, and staying at 2.2V for time t5. During the whole time from time t1 to t5, voltage Vgm1 remains at 3V.

During times t1, t2, and t3 where Vgm1−Vsup is less than a threshold voltage of source follower M1, source follower M1 operates in the saturation mode, voltage Vout being voltage Vsm1 (e.g., the voltage at the source of transistor M1) remains a constant at 2.5V. This is because voltage Vgm1 does not change during this time, and because Vout=Vgm1−Vgsm1, Vout does not change as voltage Vgm1 does not change. At times t4 and t5, when voltage Vsup drops too low, e.g., below a predetermined voltage or Vgm1−Vsup is greater than the threshold voltage of source follower M1, source follower M1 operates out of its saturation mode (e.g., saturation region) into a resistive mode or a triode region mode where it behaves like a resistor acting as a switch connected Vsup and Vout. As a result, its source voltage (e.g., voltage Vout) is substantially equal to its drain voltage (e.g., voltage Vdm1 or voltage Vsup). Alternatively expressing, voltage Vout follows voltage Vsup (e.g., Vout=Vsup). In diagram 700, voltages Vgm1 and voltage Vsup are shown overlapped during time t1 and voltages Vsup and Vout are shown overlapped during times t4 and t5. As illustrated, various embodiments of the disclosure provide a steady voltage Vout regardless of voltage Vsup as long as source follower M1 is in the saturation region, and voltage Vout follows voltage Vsup when source follower M1 is in the triode region.

Exemplary DC-DC Converter

Figure 8:
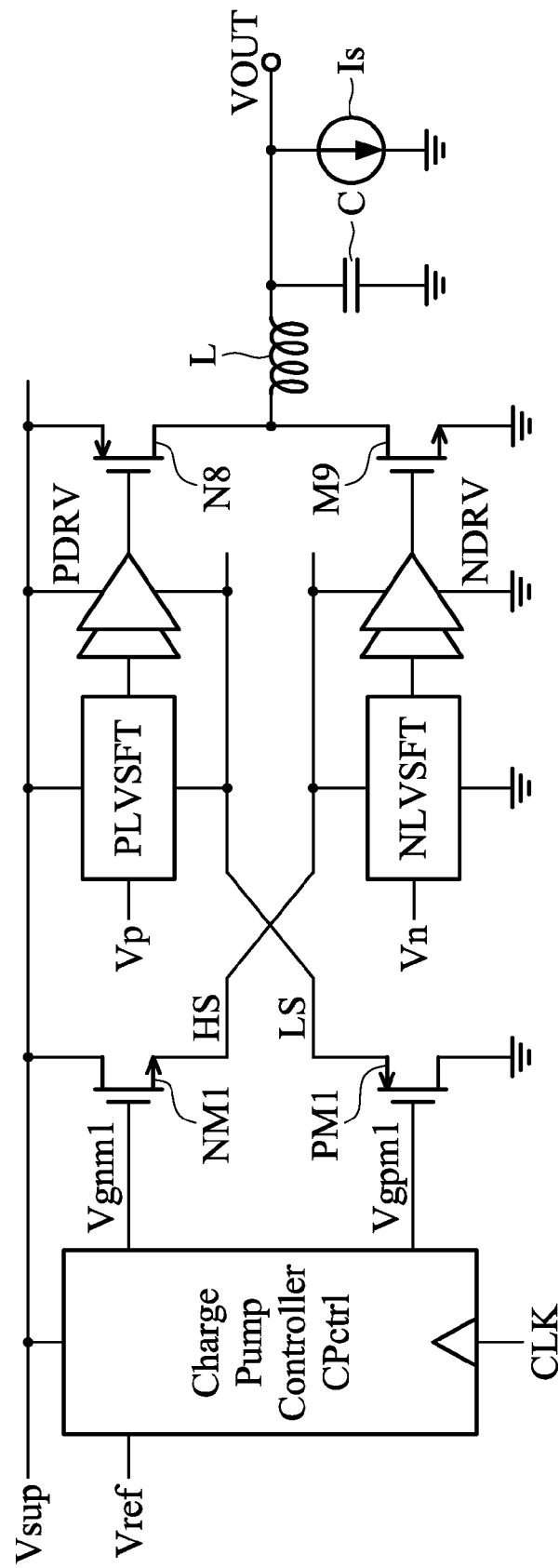
FIG. 8 shows an exemplary DC-DC converter using techniques in accordance with embodiments of the disclosure.

FIG. 8 shows an exemplary DC-DC converter 800 utilizing techniques of various embodiments of the disclosure. Depending on applications voltage Vsup may be from a battery (e.g., Vbat), and is about 3V-5.5V. Inductor L, capacitor C, and current source Is serve as the output load for converter 800. Various embodiments of the disclosure provide two internal supply voltages LS and HS driving pre-drivers NDRV and PDRV for the digital switching output Vout.

Charge pump controller CPctrl provides voltages Vgnm1 and Vgpm1 to the gate of two source followers NM1 and PM1 using techniques in accordance with embodiments of the disclosure. For example, charge pump controller CPctrl includes two charge pumps, one charge pump (e.g., charge pump 500) to drive source follower NM1 and another charge pump (e.g., charge pump 600) to drive source follower PM1. Source follower NM1 sources current to level shifter NLVSFT and pre-driver NDRV while source follower PM1 sinks current to level shifter PLVSFT and pre-driver PDRV. Output of source follower NM1 provides supply voltage LS while output of source follower PM1 provides supply voltage HS. In an embodiment voltage LS is at a maximum of 2*Vref−Vthn or no more than 2*Vref−Vthn greater than VSS being at 0V, and voltage HS is no more than voltage Vsup−2*Vref−Vthp where Vthn is the threshold voltage of an N-source follower while Vthp is the threshold voltage of a P-source follower. In this configuration, supply voltages LS and HS clamp the gate voltage of transistors M5 and M4 to predetermined levels (e.g., 2*Vref−Vthn and Vsup−2*Vref−Vthp, respectively) to meet the reliabilities and specification of drain-extended devices (e.g., transistors M4 and M5) in advance process (e.g., 0.13 μm or below). Those skilled in the art will recognize that supply voltages HS and LS are in fact voltage Vout of circuits 200 and 300 respectively. Voltage Vgnm1 and Vgpm1 are voltage Vgm1 of circuits 200 and 300 respectively.

Pre-drivers PDRV and NDRV drive the gate of PMOS transistor M4 and NMOS transistor M5 respectively. Transistors M4 and M5 form an output driver and together may be referred to as a power stage. In an embodiment, transistors M4 and M5 are both drain extended that can tolerate a high voltage from voltage Vsup. For example, the voltage at the drain of transistor M5 (e.g., voltage Vdm5, not shown) ranges from 0-5.5V, but the voltage its gate (e.g., voltage Vgm5, not shown) ranges from 0-2.5V. Similarly, the voltage at the drain of transistor M4 (e.g., voltage Vdm4, not shown) ranges between 0V and voltage Vsup and the voltage at the gate of transistor M4 (e.g., voltage Vgm4, not shown) ranges between voltage Vsup−2.5V and voltage Vsup or from 3V to 5.5V. Depending on applications, transistors M4 and M5 are large enough to handle output switching up to 1 A.

In an embodiment, the supply logic level available for DC-DC converter 800 is about 1.0V, level shifters Plvsft and Nlvsft, shift this available voltage 1.0V to provide appropriate voltages between 0V and voltage LS for transistor M5 or between voltage HS and voltage Vsup for transistor M4.

Voltages Vp and Vn control voltage level shifters Plvsft and Nlvsft respectively. In an embodiment, voltages Vp and Vn are active high and mutually exclusive. They together control whether inductor L (and thus capacitor C and output voltage Vout) is to connect to voltage Vsup through transistor M4 or to VSS through transistor M5. When voltage Vp is activated (e.g., high) it turns on level shifter Plvsft, inductor L and capacitor C are charged to voltage Vsup, and when voltage Vn is high, it turns on level shifter Nlvsft, and inductor L and capacitor C are discharged to ground. In an embodiment, the duty cycle of voltages Vp and Vn determines the energy being charged high or discharged low and the output voltage Vout.

Using the charge pump and source followers in circuit 800 in accordance with techniques of embodiments of the disclosure is efficient because circuit 800 does not consume a lot of power when the output experiences heavy switching. Further, various embodiments provide solid supply voltages LS and HS to drive a large capacitive load. DC power consumption of source followers NM1 and PM1 is very small.

Figure 9:
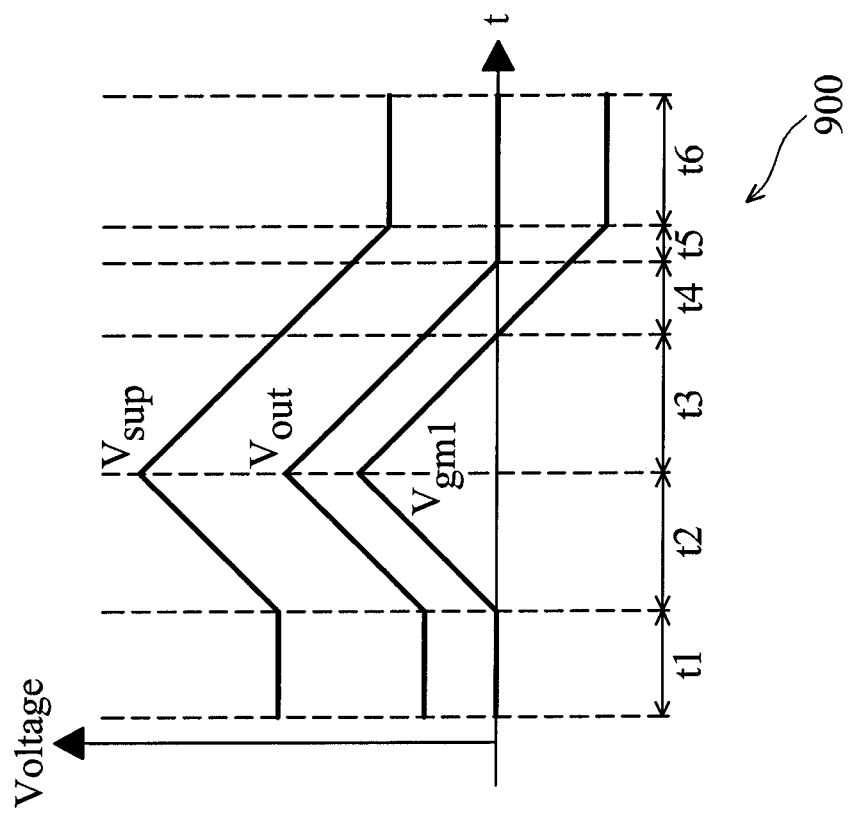
FIG. 9 shows waveforms illustrating the behavior of voltage HS in FIG. 8 with respect to other voltages.

FIG. 9 shows waveforms 900 illustrating the behavior of voltage HS (e.g., FIG. 8) or voltage Vout of circuit 300 with respect to voltage Vsup and voltage Vgm1. From times t1 to t4, when voltage Vgm1>Vthp (the threshold voltage of source follower M1) or Vsup>2*Vref+Vthp, source follower M1, a PMOS transistor, is in the saturation region, and Vout=Vgm1+Vgsm1 (the voltage across the gate and source of source follower M1). In times t5 and t6 where Vgm1<Vthp or Vsup<2*Vref+Vthp source follower M1 is in the triode region and Vout=0V. Alternatively expressing, in each time t1 to t6, the voltage relationship is as follows:

t1: Vgm1>Vthp, Vout=Vgm1+Vgsm1
t2, t3: Vgm1>Vthp, Vout=vgm1+Vgms1
t4: Vgm1>Vthp, Vout=Vgm1+Vgms1
t5: Vgm1<Vthp, Vout=0V
t6: Vgm1<Vthp, Vout=0V As indicated above, source follower M1 is in the saturation mode from times t1 to t4, and in the triode mode in times t5 and t6.

A number of embodiments of the disclosure have been described. It will nevertheless be understood that various modifications may be made without departing from the spirit and scope of the invention. For example, charge pump CP in circuit 500 doubling voltage Vref is used for illustration, other charge pump providing different voltage levels (multiplying voltage Vref, add or minus Vref from Vsup, etc.) are within the scope of embodiments of the invention. Various transistors are shown to be NMOS and some others are shown to be PMOS, but the disclosure is not limited to such a configuration because selecting a transistor type (e.g., NMOS or PMOS) is a matter of design choice based on need, convenience, etc. Embodiments of the disclosure are applicable in variations and combinations of transistor types. Some signals are illustrated with a particular logic level to operate some transistors, but selecting such levels and transistors are also a matter of design choice, and embodiments of the disclosure are applicable in different design choices.

Embodiments that combine different embodiments are within scope of the invention and will be apparent to those skilled in the art after reviewing this disclosure.

What is claimed is:

1. A regulator comprising:
a charge pump adapted to provide a first voltage;
a master source follower adapted to receive the first voltage at a gate of the master source follower; a source of the master source follower adapted to provide an output voltage for the regulator; the master source follower being configured to operate in a first mode where the output voltage is substantially constant and to operate in a second mode where the output voltage substantially follows a second voltage at a drain of the master source follower; and
a feedback circuit configured to receive a feedback voltage from the master source follower and to selectively activate and deactivate the charge pump in response to the feedback voltage;
wherein the master source follower is configured to operate in the first mode when the first voltage minus the second voltage is less than a threshold voltage of the master source follower, and to operate in the second mode when the first voltage minus the second voltage is greater than the threshold voltage of the master source follower.

2. The regulator of claim 1 wherein the charge pump is adapted to provide the first voltage based on a reference voltage.

3. The regulator of claim 1 further comprising at least one slave source follower; a gate of the at least one slave source follower being shared with the game of the master source follower.

4. The regulator of claim 3 wherein a size of a slave source follower is bigger than a size of the master source follower.

5. The regulator of claim 3 further comprising a first device adapted to provide a first current path for the master source follower and a second device adapted to provide a second current path for the at least one slave source follower.

6. The regulator of claim 1 wherein the master source follower is at least one of an N-type or P-type.

7. The regulator of claim 6, wherein the master source follower is an N-type source follower.

8. The regulator of claim 6, wherein the master source follower is a P-type source follower.

9. The regulator of claim 1 wherein the feedback circuit is further configured to be based on a clock.

10. The regulator of claim 1 wherein the feedback circuit is configured to be connected to either the gate or the source of the master source follower.

11. The regulator of claim 1, wherein the feedback circuit comprises an AND gate.

12. A DC-DC converter comprising:
a first charge pump adapted to provide a first voltage to a gate of first source follower; a first source of the first source follower adapted to provide a first supply voltage at a first power node;
a second charge pump adapted to provide a second voltage to a gate of a second source follower, a second source of the second source follower adapted to provide a second supply voltage at a second power node;
a first circuit coupled between a third power node and the second power node, the third power node being configured to receive a third supply voltage, and the third supply voltage being higher than the second supply voltage; and a second circuit coupled between the first power node and a fourth power node, the fourth power node being configured to receive a fourth supply voltage, the first supply voltage being higher than the fourth supply voltage, and the third supply voltage being higher than the fourth supply voltage.

13. The DC-DC converter of claim 12 wherein the first source follower is of N-type and the second source follower is of P-type.

14. The DC-DC converter of claim 12 further comprising a first extended drain transistor driven by the first circuit and a second extended drain transistor adapted to be driven by the second circuit.

15. The DC-DC converter of claim 12 wherein the first supply voltage and the second supply voltage are adapted to be internal in integrated applications.

16. The DC-DC converter of claim 12 wherein the first supply voltage and the second supply voltage are adapted to be substantially the same.

17. A method comprising
providing a source follower having
a gate receiving a gate voltage;
a source providing an output voltage;
a drain receiving a supply voltage;
using a charge pump to provide a first constant voltage level at the gate;
selectively activating and deactivating the charge pump using a feedback circuit connected to the source follower;
causing the source follower to operate in a first mode thereby having the output voltage at a second constant level; and
causing the source follower to operate out of the first mode into a second mode whereby causing the output voltage to substantially follow the supply voltage;
wherein the source follower operates in the first mode when the gate voltage minus the supply voltage is less than a threshold voltage of the source follower and operates in the second mode when the gate voltage minus the supply voltage is greater than the threshold voltage of the source follower.

18. The method of claim 17 wherein the first constant voltage level is calculated based on one or a combination of a threshold voltage of the source follower, a voltage from the gate to the source of the source follower.

19. The method of claim 17, wherein the selectivity activating and deactivating the charge pump is performed in response to a feedback voltage from the source follower.

20. The method of claim 17 wherein the feedback voltage is from the gate or the source of the source follower.

21. The method of claim 19, wherein the controlling the selectively activating and deactivating the charge pump comprises deactivating the charge pump when the feedback voltage is greater than a reference voltage.

* * * * *